(12) United States Patent
Kikinis et al.

(10) Patent No.: US 8,793,732 B2
(45) Date of Patent: *Jul. 29, 2014

(54) UNIVERSAL PROGRAMMING SYSTEM AND METHOD FOR ELECTRONIC PROGRAMMING GUIDE

(75) Inventors: Dan Kikinis, Saratoga, CA (US); Yakov Kamen, Cupertino, CA (US)

(73) Assignee: JLB Ventures, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,863

(22) Filed: Jan. 6, 2012

(65) Prior Publication Data

US 2012/0102525 A1 Apr. 26, 2012

Related U.S. Application Data

(63) Continuation of application No. 12/407,897, filed on Mar. 20, 2009, now Pat. No. 8,104,061, which is a continuation of application No. 09/708,220, filed on Nov. 7, 2000, now Pat. No. 7,516,469.

(51) Int. Cl.
*G06F 13/00* (2006.01)
*G06F 3/00* (2006.01)
*H04N 5/445* (2011.01)

(52) U.S. Cl.
USPC .................. 725/45; 725/41; 725/44; 725/46; 725/47

(58) Field of Classification Search
USPC ......................................... 725/38, 41, 44–47
See application file for complete search history.

(56) References Cited

U.S. PATENT DOCUMENTS

| | | |
|---|---|---|
| 4,621,259 A | 11/1986 | Schepers et al. |
| 5,414,773 A | 5/1995 | Handelman |
| 5,479,268 A | 12/1995 | Young et al. |
| 5,526,034 A | 6/1996 | Hoarty et al. |
| 5,532,754 A | 7/1996 | Young et al. |
| 5,550,576 A | 8/1996 | Klosterman |
| 5,550,578 A | 8/1996 | Hoarty et al. |
| 5,684,525 A | 11/1997 | Klosterman |
| 5,737,028 A | 4/1998 | Bertram et al. |
| 5,745,710 A | 4/1998 | Clanton et al. |
| 5,751,282 A | 5/1998 | Girard et al. |
| 5,760,821 A * | 6/1998 | Ellis et al. ........................ 725/50 |
| 5,818,441 A | 10/1998 | Throckmorton et al. |
| 5,828,945 A | 10/1998 | Klosterman |
| 5,841,563 A | 11/1998 | Effenberger |
| 5,850,218 A | 12/1998 | LaJoie et al. |
| 5,900,915 A | 5/1999 | Morrison |
| 5,905,492 A | 5/1999 | Straub et al. |
| 5,923,362 A | 7/1999 | Klosterman |
| 5,926,168 A | 7/1999 | Fan |
| 5,929,849 A | 7/1999 | Kikinis |

(Continued)

FOREIGN PATENT DOCUMENTS

| | | |
|---|---|---|
| JP | 410093880 A | 4/1998 |
| WO | 0001149 A1 | 1/2000 |

*Primary Examiner* — Hunter B Lonsberry
(74) *Attorney, Agent, or Firm* — Banner & Witcoff, Ltd.

(57) ABSTRACT

A content listing may provide a listing of content items a variety of ways including using 3-D images, alphanumeric text, and video data. Viewers and/or programmers may be allowed to select between varying display environment. In addition, non-content listing objects, such as interaction objects, may be conflated with the presentation of the display environment and with the content listing information.

21 Claims, 4 Drawing Sheets

Object EPG World (layout selection)

380 →
{ Object layout ... End Object —382
Object element ... End Object —384
Object element ... End Object —386 } 390

End Object.

(56) References Cited

U.S. PATENT DOCUMENTS

| | | |
|---|---|---|
| 5,940,073 A | 8/1999 | Klosterman et al. |
| 5,956,456 A | 9/1999 | Bang et al. |
| 5,999,167 A | 12/1999 | Marsh et al. |
| 6,029,195 A | 2/2000 | Herz |
| 6,034,678 A | 3/2000 | Hoarty et al. |
| 6,072,983 A | 6/2000 | Klosterman |
| 6,075,575 A | 6/2000 | Schein et al. |
| 6,078,348 A | 6/2000 | Klosterman et al. |
| 6,100,883 A | 8/2000 | Hoarty |
| 6,167,188 A | 12/2000 | Young et al. |
| 6,177,931 B1 * | 1/2001 | Alexander et al. ............ 725/52 |
| 6,205,485 B1 | 3/2001 | Kikinis |
| 6,205,582 B1 | 3/2001 | Hoarty |
| 6,233,389 B1 | 5/2001 | Barton et al. |
| 6,240,555 B1 | 5/2001 | Shoff et al. |
| 6,271,831 B1 | 8/2001 | Escobosa et al. |
| 6,502,243 B1 * | 12/2002 | Thomas ..................... 725/110 |
| 6,662,177 B1 | 12/2003 | Martino et al. |
| 6,681,395 B1 | 1/2004 | Nishi |
| 6,754,906 B1 * | 6/2004 | Finseth et al. ............... 725/45 |
| 6,799,326 B2 * | 9/2004 | Boylan et al. ............... 725/35 |
| 6,990,677 B1 | 1/2006 | Pietraszak et al. |
| 8,104,061 B2 * | 1/2012 | Kikinis et al. ............... 725/45 |
| 2005/0015815 A1 * | 1/2005 | Shoff et al. ................. 725/135 |

* cited by examiner

Object Schedule item;

300 →
- 310 — Description: Title
- 320 — Description: Channel ID
- 330 — Description: Localized
- 335 — Description: Start Time
- 340 — Description: Run Length
- 345 — Description: Ad overlay; permissive classes — 350
- 360 — Description: etc.

End Object.

Figure 3A

Object EPG World (layout selection)

380 →
- Object layout ... End Object — 382 ⎫
- Object element ... End Object — 384 ⎬ 390
- Object element ... End Object — 386 ⎭

End Object.

Figure 3B

Object NONEPG_Object

392 →    Object ... End Object ~393

Object Interaction ... End Object ~394

End Object.

Figure 3C

UNIVERSAL PROGRAMMING SYSTEM AND METHOD FOR ELECTRONIC PROGRAMMING GUIDE

RELATED APPLICATIONS

This application is a continuation of pending U.S. application Ser. No. 12/407,897, entitled "UNIVERSAL PROGRAMMING SYSTEM AND METHOD FOR ELECTRONIC PROGRAMMING GUIDE," and filed Mar. 20, 2009, which is a continuation of U.S. Pat. No. 7,516,469, entitled "UNIVERSAL PROGRAMMING SYSTEM AND METHOD FOR ELECTRONIC PROGRAMMING GUIDE," and issued Apr. 7, 2009. The content of the above noted applications are hereby incorporated by reference in their entirety.

FIELD OF THE INVENTION

The present invention relates generally to electronic programming guides and, more particularly, to a programming system for an electronic programming guide.

BACKGROUND OF THE INVENTION

Electronic programming guides (EPGs) are often programmed for set-top boxes (STBs), which typically have a low-speed CPU and extremely limited memory. Such EPGs are simple and limited in functionality. For example, most of these EPGs operate in the same basic fashion: scheduled program information is transmitted to a STB on a viewer's premises by an appropriate form of transmission (e.g., broadcast, direct satellite, cable, etc.). The set-top box CPU retains the transmission in memory so that the scheduled programming information may be subsequently viewed on a viewer's television set in response to user-generated signals. The information generally appears in a grid structure on the television screen with multiple columns corresponding to a designated time slot (e.g., 30 minutes) and multiple rows corresponding to a different television channel.

Any minimal design upgrade of the user interface or other EPG functions requires significant redesign of the EPG and reprogramming of the STB. As a result, broadcasters and content developers cannot easily upgrade the software in existing EPGs, and are often even required to replace the hardware, or at least upgrade the memory, CPU, etc. Moreover, because of the limited resolution quality of conventional television screens, the viewer can only see about 1.5 hours of programming at a time for only a few channels. In addition, current EPGs allow for only one font size. Unfortunately, viewers do not all have the same depth of vision. Therefore, some viewers may be unable to read the programming information on the television screen. Confounding this problem is the fact that existing EPGs do not have very advanced lighting capabilities, which detracts from the functionality of the EPG.

In essence, to date EPG's have been unsophisticated, limited in utility, and difficult to upgrade. This detracts from the enjoyment of television viewing and also limits the viewer's desire to make the upgrades necessary to improve the functionality of existing EPGs.

SUMMARY OF THE INVENTION

The present invention provides an improved EPG that can display programming information in a variety of ways (e.g., 3-D images, alphanumeric text, and video data) and that also allows viewers and/or television programmers to select between varying programming worlds according to viewer and/or programmer preferences.

An EPG in accordance with an embodiment of the present invention provides for a memory or database which contains objects a through n. One class of objects is a pseudo-descriptive language that describes, for example, program events or schedule times. Such an object has a title and/or a channel ID that can be converted into the actual channel number or program association (e.g., Channel 7 equals ABC, etc.).

In a further aspect of the present invention, an additional class of objects contain a variety of world descriptions. This class of objects provides a 3-D enabled EPG, including a 3-D virtual world whose end result is the view that the user gets.

Such multiple user interfaces, environments, and even logics may be loaded into the same device at the same time, and by choosing a particular EPG world, various layouts may be achieved. One layout may mimic the look of a classic 2-D EPG approach. Another layout may mimic, for example, a futuristic science fiction type of environment in space, with rotating carousels showing movie previews, etc. A third layout may offer, for example, an environment mimicking video games such as DOOM™, etc. In addition, there may be a dynamic relationship between the selection of content by a user and the selection of a specific world (e.g., the selection of the sports channel by the user changes the world to a ballpark, the selection of the Disney channel changes the world to a Disney world, etc.).

In these various environments, channels may be organized by different classes so that the EPG world may contain, in addition to its layout and descriptions, one through n elements with objects. In turn, each of these objects may be linked or assigned to one of the items to display, such as schedule items, etc.

In addition, there may be non-EPG objects, such as interaction objects. These may be used for e-commerce activities, etc., and may be conflated with the presentation of the world along with the programming schedule items.

BRIEF DESCRIPTION OF THE DRAWINGS

The present invention is illustrated by way of example, and not limitation, in the figures of the accompanying drawings in which like reference numerals refer to similar elements and which:

FIG. 3a shows a pseudo-descriptive language containing one class of objects for an EPG according to an embodiment of the present invention.

FIG. 3b shows a description of a 3-D world in another class of objects for an EPG according to an embodiment of the present invention.

FIG. 3c shows a description of a non-EPG object according to an embodiment of the present invention.

DETAILED DESCRIPTION

Described herein is a universal programming system and method for an EPG. Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

One limitation of prior art EPGs is that they are unsophisticated. That is, programming information is typically displayed in a grid structure on a television screen. This information is often not very detailed and may be difficult for some viewers to read. Moreover, prior art EPGs are difficult to upgrade.

It would be helpful if an improved EPG system existed to allow users to display programming information in a variety of ways (e.g., including 3-D images) and to allow 15 users to vary programming worlds according to certain preferences.

Figure 1:
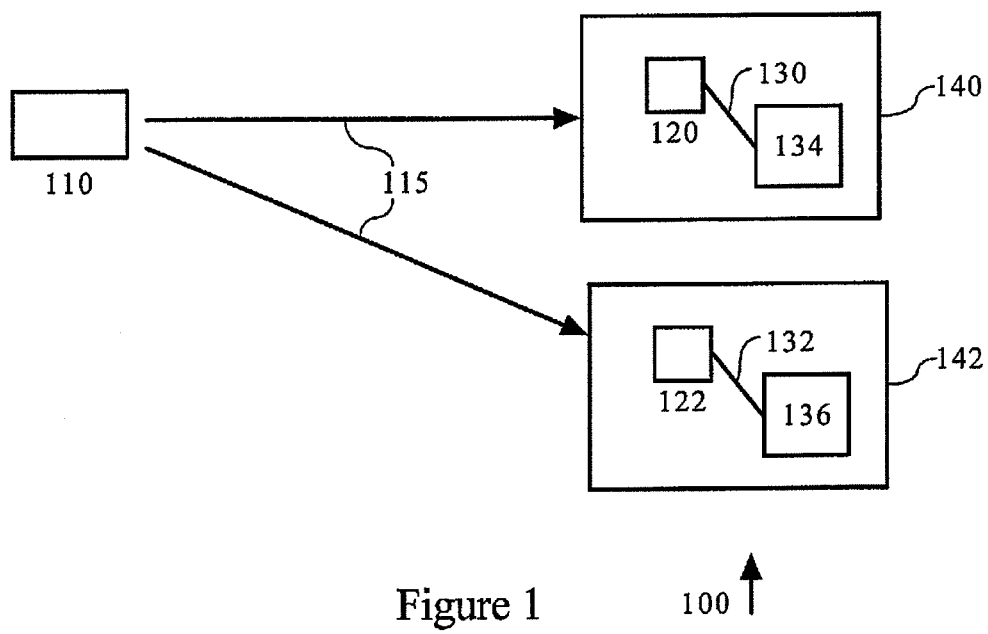
FIG. 1 shows a block diagram of a conventional EPG system according to the prior art.

Referring now to FIG. 1 there is shown a block diagram of a conventional EPG system 100 according to the prior art. A service provider 110 such as a broadcaster or a cable television provider, broadcasts a transmission 115 to a plurality of subscribers, each having a set-top box 120 and 122, etc. Signal may be distributed and received through a variety of means, including optical, microwave, electrical or other forms of transmission. Signal includes EPG data 130 and 132, etc., which is displayed on television screens 134 and 136, etc., as part of television systems 140 and 142, etc. EPG data 130 and 132, etc., is displayed in a matrix of rectangular boxes containing text (not shown in this view) in a manner well known in the art.

Figure 2:
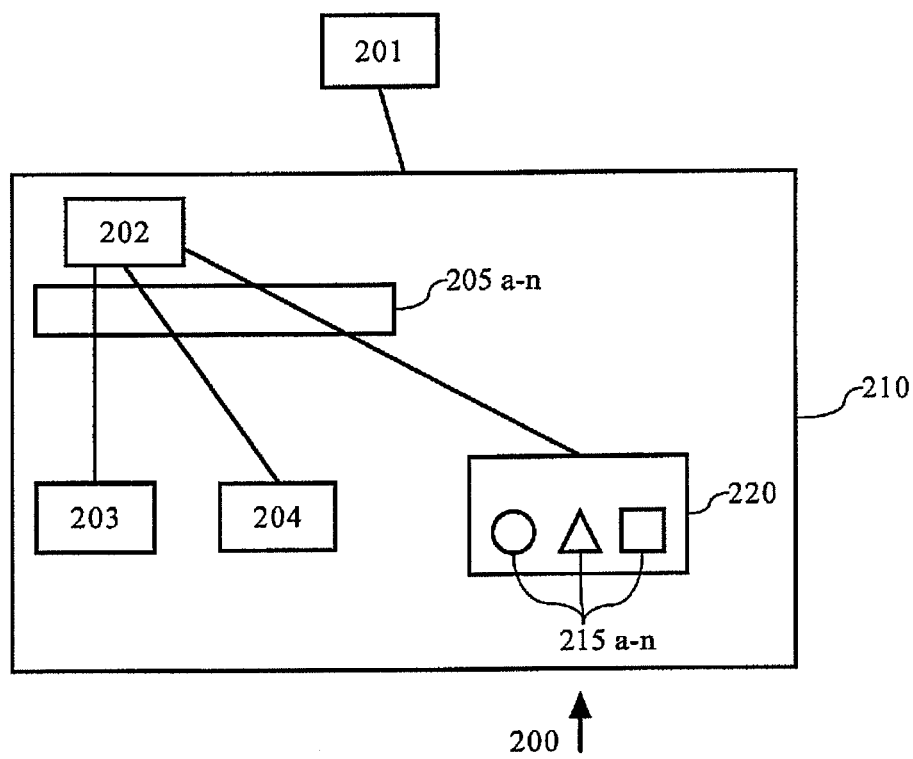
FIG. 2 shows an overview of the software architecture of a programming system for an EPG according to an embodiment of the present invention.

Referring now to FIG. 2 there is shown an overview of the software architecture of a programming system for an EPG 200 according to an embodiment of the present invention. The present invention may be implemented in any television system (not shown in this view) including analog (e.g., using CRTs technology) as well as digital technologies (e.g., HDTV supporting interlaced format). A user interface 201 such as a wireless remote control device (using a signal transmission method such as infrared, RF, inductive, or any other available method) may communicate with the television system. In the present embodiment, the remote control device contains a mechanism (e.g., a joystick, track ball, touch pad, mouse, lever, etc.) by which the user can manipulate a cursor on a television screen. Of course, remote control device could also be any one of numerous control devices known in the art, including a wireless keyboard, a wireless pointer device, etc. It is also possible not to use a remote control device at all, and to just use a key pad, cursor, etc., attached directly to the television system.

In the embodiment illustrated by FIG. 2, the software architecture of the programming system 200 resides in a set-top box 210. The set-top box 210 typically includes the user interface 201 which comprises a CPU coupled to a read-only memory (ROM) and a random-access memory (RAM) (not show in this view). The ROM includes instructions and data for executing on the CPU. The RAM is used for storing program variables for the program instructions contained in the ROM. In another embodiment, the software architecture of the system may reside in the television system or may be built into a VCR.

A presentation engine 202 has drivers or connectors 205 a through n. One such driver is driver 203 which connects to the operating system within the set-top box 210 and allows the presentation engine 202 to communicate with such things as a television tuner, data for replenishing programming information, and the like. In addition, there is a memory or database 220 in the system, which contains objects 215 a through n. In the present embodiment, the database 220 resides in the memory. However, since the architecture of the here-referenced system also has hard disks, the database may also be in the hard disk, or in both the memory and the hard disk. An interface 204 provides for a 3-D enabled EPG virtual world whose end result is the view that the user gets. Rather than hard-programming one world into the application and allowing objects such as programs, etc., to be filled-in, numerous objects 215 a through n contain various world descriptions.

The interface 204 displays objects with real shapes on a television screen along with rectangular or bar shaped text blocks (rather than displaying a matrix of rectangular boxes containing text). For example, one method for displaying real shapes involves using 3-D accelerator technology. In one embodiment, the graphics circuitry that provides the information displayed on the television screen stores the image elements in a 3-D model and generates the image using a 3-D accelerator. This is done in a manner similar to that described in our U.S. patent application Ser. Nos. 09/344,442, filed Jun. 25, 1999, now U.S. Pat. No. 6,342,884, issued Jan. 29, 2002, entitled "Method and Apparatus for using a General Three-Dimensional (3D) Graphics Pipeline for Cost Effective Digital Image and Video Edition, Transformation and Representation" and 09/361,470, filed Jul. 27, 1999, now U.S. Pat. No. 6,456,287, issued Sep. 24, 2002, entitles "Method and Apparatus for 3D Model Creation Based on 2D Images" and our co-pending U.S. patent application Ser. No. 09/488,361, now U.S. Pat. No. 6,421,067, issued Jul. 16, 2002, entitled "Electronic Programming Guide" (all of which describe 3-D accelerator technology and are incorporated herein by reference). Briefly, this is accomplished by a) storing a computer model of a geometric surface of one or more pictograms in a first set of memory locations within the television STB; b) storing within a second set of memory locations a two dimensional image to be mapped onto that surface (e.g., a pixel array); and c) constructing a pixel array comprising image.

According to the present embodiment, a variety of world descriptions in the objects 215 a through n provide the user with schedule information (or other information as typically presented in EPGs or IPGs) for broadcast programs using the 3-D accelerator technology mentioned herein. These 3-D enabled objects 215 provide a 3-D virtual world whose end result is the view that the user gets. For example, one layout may mimic a futuristic science fiction type of environment in space, with rotating carousels showing movie previews (not shown in this view). Another layout may offer, for example, an environment mimicking video games, such as Doom™, etc. (not shown in this view). Still another environment may offer the look of a classic 2-D EPG approach (not shown in this view).

In these various environments, channels (not shown in this view) may be organized by different classes, so the EPG world may contain, in addition to its layout and world descriptions, a through n elements with objects 215. In turn, each of those objects would then be linked or assigned to one of the items to display, such as schedule items, etc. In addition, there may be a dynamic relationship between the selection by the user of a specific content and the selection of a specific world (e.g., the selection of the sports channel by the viewer changes the world to a ballpark, the selection of the Disney channel changes the world to a Disney world, etc.).

Another class of objects 215 contain a pseudo-descriptive language. Such an object may convert a title or channel identification into an actual channel or program association.

There may also be non-EPG objects 215, such as interaction objects. These may be used for e-commerce activities, etc., and may be mixed in with the presentation of the world along with the programming schedule items. For example, the selection of the sports channel by the user may bring forth a virtual world with the image of a large baseball and bat and a logo indicating that a baseball game is being shown on a particular channel. By clicking on the logo, a user may obtain a list of products that may be purchased using an interactive television system in a manner well known in the art.

In one embodiment, the user can customize which EPG world he wants based on user preferences. For instance, EPG worlds can be catered to age categories of viewers, with particular worlds selected for the interests of senior citizens, teenagers, children, etc. In another embodiment, the programmer may decide which world the user views. For example, CNN may make a deal with the programmer saying that all CNN channels are to appear in the News World and not the viewer's chosen environment. Or, the programmer may offer 2-3 different world choices, and the viewer may choose among them. Of course, numerous other programming options are available in the system as well.

Referring now to FIG. 3A there is shown a pseudo-descriptive language containing one class of objects for an EPG 300 according to an embodiment of the present invention. Such an object as shown in FIG. 3A has a title 310 and/or a channel identification 320 that may be converted into the actual channel number or program association. For example, Channel 7 may be converted to ABC, etc. It may have localized aspects such as local start time 335, run length or end time 340, ad overlay 345, permissive choice of advertisements 350, etc. Other important parameters 360 may also be included in the class of objects as demonstrated in FIG. 3A.

Referring now to FIG. 3B there is shown a description of a 3-D world in another class of objects for an EPG 380 according to an embodiment of the present invention. Objects 382, 384, 386, etc., may be used to build the world and then the entire world description 390 is an object itself.

Referring now to FIG. 3C there is shown a description of a non-EPG object 392 according to an embodiment of the present invention. The objects 393 and 394, etc., in FIG. 3C may be interaction objects and can be used for e-commerce activities. The objects 393 and 394, etc., may be mixed in the presentation of the world along with the schedule item objects (not shown in this view).

Figure 4:
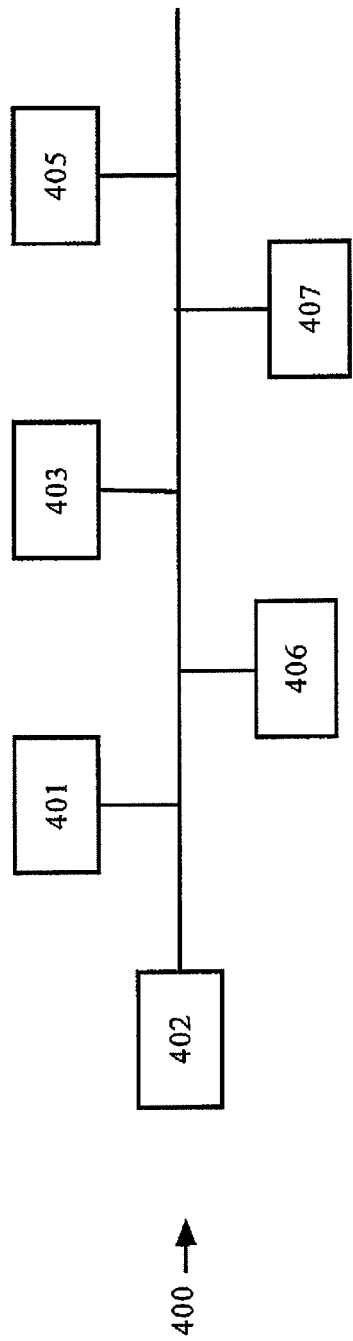
FIG. 4 is one example of a computer system according to an embodiment of the present invention.

The system and method disclosed herein may be integrated into advanced Internet-or network-based knowledge systems as related to information retrieval, information extraction, and question and answer systems. FIG. 4 is an example of one embodiment of a computer system 400. The system shown has a processor 401 coupled to a bus 402. Also shown coupled to the bus 402 are a memory 403 which may contain objects (See FIG. 2 objects 215 a through n). Additional components shown coupled to the bus 402 are a storage device 405 (such as a hard drive, floppy drive, CD-ROM, DVD-ROM, etc.), an input device 406 (such as a keyboard, mouse, light pen, bar-code reader, scanner, microphone, joystick, etc.), and an output device 407 (such as a printer, monitor, speakers, etc.). Of course, an exemplary computer system could have more components than these or a subset of the components listed.

The system and method described herein may be stored in the memory of a computer system (i.e., a set-top box) as a set of instructions to be executed, as shown by way of example in FIG. 4. In addition, the instructions to perform the system and method described herein may alternatively be stored on other forms of machine-readable media, including magnetic and optical disks. For example, the system and method of the present invention may be stored on machine-readable media, such as magnetic disks or optical disks, which are accessible via a disk drive (or computer-readable medium drive). Further, the instructions may be downloaded into a computing device over a data network in the form of a compiled and linked version.

Alternatively, the logic to perform the system and method described herein may be implemented in additional computer and/or machine-readable media such as discrete hardware components as large-scale integrated circuits (LSI's), application specific integrated circuits (ASIC's), and firmware such as electrically erasable programmable read-only memory (EEPROM's).

Thus, a universal programming system for an EPG system and method has been described. Although the foregoing description and accompanying figures discuss and illustrate specific embodiments, it should be appreciated that the present invention is to be measured only in terms of the claims that follow.

What is claimed is:

1. A system, comprising:
   a processor; and
   memory operatively coupled to the processor and storing computer readable instructions that, when executed, cause the system to:
   receive a selection of content;
   select, based on the received selection of content, a display environment of a plurality of display environments associated with the content, wherein layout features of at least one of the plurality of display environments are defined by a first class of objects, wherein schedule information associated with the content listing is defined by at least one object of a second class of objects including a location identification of a corresponding content item; and
   generate a content listing incorporating the selected display environment by combining selected objects from each of the first and second classes of objects to present the content listing incorporating the selected display environment.

2. The system of claim 1, wherein one or more user interaction objects is defined by a third class of objects.

3. The system of claim 1, wherein each object of the second class of objects includes a start time of the corresponding content item or a run length of the corresponding content item.

4. The system of claim 1, wherein the schedule information includes a choice of advertisements.

5. The system of claim 1, wherein another display environment, different from the selected display environment, is selectable by a user.

6. The system of claim 1, wherein the memory resides in a set-top box or in a television.

7. The system of claim 1, wherein the second class of objects includes content information specific to a location of a viewer.

8. The system of claim 1,
   wherein a first display environment is selected from the plurality of display environments in response to receiving a first selection of content,
   wherein a second display environment is selected from the plurality of display environments in response to receiving a second selection of content different from the first selection of content, and
   wherein the second display environment is different from the first display environment.

9. The system of claim 1, wherein the schedule information associated with the content listing is defined in a pseudo-descriptive language.

10. A method, comprising:
  receiving a selection of content;
  selecting, based on the received selection of content, a display environment of a plurality of display environments associated with the content, wherein layout features of at least one of the plurality of display environments are defined by a first class of objects, wherein schedule information associated with the content listing is defined by at least one object of a second class of objects including a location identification of a corresponding content item; and
  generating a content listing incorporating the selected display environment by combining selected objects from each of the first and second classes of objects to present the content listing incorporating the selected display environment.

11. The method of claim 10, wherein one or more user interaction objects is defined by a third class of objects.

12. The method of claim 11, wherein the one or more user interaction objects correspond to displayable and interactive electronic commerce objects.

13. The method of claim 10, wherein each object of the second class of objects includes a start time of the corresponding content item or a run length of the corresponding content item.

14. The method of claim 10, wherein the schedule information includes a choice of advertisements.

15. The method of claim 10, wherein another display environment, different from the selected display environment, is selectable by a user.

16. The method of claim 10, wherein the method is executed in a set-top box or in a television.

17. The method of claim 10, wherein the second class of objects includes content information specific to a location of a viewer.

18. A non-transitory machine-readable storage medium storing instructions that, when executed, cause a computing device to:
  receive a selection of content;
  select, based on the received selection of content, a display environment associated with the content of a plurality of display environments, wherein layout features of at least one of the plurality of display environments are defined by a first class of objects, wherein schedule information associated with the content listing is defined by at least one object of a second class of objects including a location identification of a corresponding content item; and
  generate a content listing incorporating the selected display environment by combining selected objects from each of the first and second classes of objects to present the content listing incorporating the selected display environment.

19. The non-transitory machine-readable storage medium of claim 18, wherein each of the display environments correspond to a different visual theme comprising one or more images.

20. The non-transitory machine-readable storage medium of claim 18, having additional instructions stored thereon that, when executed, cause the computing device to:
  re-generate the content listing based on another display environment different from the selected display environment.

21. The non-transitory machine-readable storage medium of claim 18, wherein the schedule information further includes a start time of the corresponding content item and a run length of the corresponding content item.

* * * * *